(12) United States Patent
Bende

(10) Patent No.: US 10,811,648 B2
(45) Date of Patent: Oct. 20, 2020

(54) HOUSING ASSEMBLY FOR BATTERY MODULE

(71) Applicant: Miklos Bende, Oak Brook, IL (US)

(72) Inventor: Miklos Bende, Oak Brook, IL (US)

( * ) Notice: Subject to any disclaimer, the term of this patent is extended or adjusted under 35 U.S.C. 154(b) by 185 days.

(21) Appl. No.: 16/027,832

(22) Filed: Jul. 5, 2018

(65) Prior Publication Data

US 2020/0014008 A1    Jan. 9, 2020

(51) Int. Cl.
| | |
|---|---|
| *H01M 2/10* | (2006.01) |
| *H01R 4/18* | (2006.01) |
| *H01R 25/16* | (2006.01) |
| *H01M 2/20* | (2006.01) |

(52) U.S. Cl.
CPC ......... *H01M 2/1083* (2013.01); *H01M 2/206* (2013.01); *H01R 4/183* (2013.01); *H01R 25/162* (2013.01); *H01M 2220/20* (2013.01)

(58) Field of Classification Search
CPC .......... H01M 10/052; H01M 10/0525; H01M 2220/20; H01M 2/043; H01M 2/1016; H01M 2/1072
See application file for complete search history.

(56) References Cited

U.S. PATENT DOCUMENTS

| | | |
|---|---|---|
| 2,707,721 A | 5/1955 | Anderson et al. |
| 4,255,502 A | 3/1981 | Taylor, III |
| 4,885,524 A | 12/1989 | Wilburn |
| 5,162,164 A | 11/1992 | Dougherty et al. |
| 5,939,960 A | 8/1999 | Godel et al. |
| 7,573,229 B2 | 8/2009 | Arakelian |
| 8,514,039 B1 | 8/2013 | Yamane et al. |
| 9,525,195 B2 | 12/2016 | Wyatt et al. |
| 2008/0118819 A1 | 5/2008 | Gamboa |
| 2011/0189533 A1 | 8/2011 | Reis et al. |
| 2014/0295250 A1 | 10/2014 | Nishikawa et al. |
| 2015/0037616 A1 | 2/2015 | Wyatt et al. |
| 2015/0037640 A1 | 2/2015 | Pinon et al. |
| 2015/0318521 A1 | 11/2015 | Zeiler et al. |
| 2016/0006087 A1 | 1/2016 | Lee |
| 2016/0093845 A1 | 3/2016 | Dekeuster et al. |
| 2016/0093848 A1 | 3/2016 | Dekeuster et al. |

(Continued)

FOREIGN PATENT DOCUMENTS

WO    2016/205386    12/2016

OTHER PUBLICATIONS

Search Report & Written Opinion issued in Int'l App. No. PCT/US2019/036965.

*Primary Examiner* — Robert S Jones
*Assistant Examiner* — Rachel L Zhang
(74) *Attorney, Agent, or Firm* — Barnes & Thornburg LLP

(57) ABSTRACT

A housing assembly for installing in a vehicle or other equipment at least one battery module having a pair of battery terminals with a distance therebetween, including a receiver defining a receptacle for receiving the battery module and a pair of battery terminals. The distance between the battery terminals of the housing assembly is greater than the distance between the battery terminals of the battery module. The distance between the battery terminals of the housing assembly may be the same as the distance between the battery terminals of a standard battery. The exterior dimensions of the housing assembly may be the same as the exterior dimensions of a standard battery.

23 Claims, 10 Drawing Sheets

(56) References Cited

U.S. PATENT DOCUMENTS

| | | |
|---|---|---|
| 2016/0093852 A1 | 3/2016 | Dekeuster et al. |
| 2016/0093854 A1 | 3/2016 | Tyler et al. |
| 2016/0197332 A1* | 7/2016 | Lee .................... H01M 2/1077 429/159 |
| 2016/0380252 A1 | 12/2016 | Rhein |
| 2017/0146611 A1* | 5/2017 | Yonan ................... H01M 10/42 |
| 2018/0053926 A1 | 2/2018 | Shaffer, II et al. |

* cited by examiner

HOUSING ASSEMBLY FOR BATTERY MODULE

The present disclosure relates to a housing assembly for a battery module.

BACKGROUND

Automobiles and other vehicles and equipment typically are designed with a certain standard battery size in mind. During the design, the clearances around and above the battery, the battery tray, the method of securing the battery, the positive and negative lead lengths typically are all predetermined based on such certain standard battery size. As a result, battery modules that do not have such standard battery size typically cannot be used with such equipment.

SUMMARY

The present disclosure relates to a housing assembly for installing in a vehicle at least one battery module having a first positive battery terminal and a first negative battery terminal and a distance therebetween. The housing assembly comprises a receiver defining a receptacle for receiving the battery module and a second positive battery terminal and a second negative battery terminal. The distance between the second positive battery terminal and the second negative battery terminal is greater than the distance between the first positive battery terminal and the first negative battery terminal. The housing assembly further comprises a first electrical connector for interconnecting the first positive battery terminal and the second positive battery terminal, and a second electrical connector for interconnecting the first negative battery terminal and the second negative battery terminal. The distance between the second positive battery terminal and the second negative battery terminal may be the same as the distance between a positive battery terminal and a negative battery terminal of a standard battery.

The housing assembly may also include a lid for enclosing the receptacle. The exterior dimensions, length, width and height of the housing assembly when assembled may be the same or nearly the same as the exterior dimensions of a standard battery.

The housing assembly may include one or more partitions, receivable in the receptacle for holding the battery module in place within the receptacle, and engaging structure for engaging the receiver and the partition. For example, the receiver may define a pair of opposed walls with the engaging structure formed on the walls that may define at least one slot for receivingly engaging the partition.

The housing assembly may also comprise an extension engaged with the receiver. The extension defines an aperture for receiving either the second positive battery terminal or the second negative battery terminal. The extension may be slidably engaged with the receiver. For example, the receiver may include a wall having an outside that defines a slot and the extension includes an embossment slidingly receivable within the slot. The extension defines an aperture for receiving the terminal cable.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

FIGS. 1-10 illustrate three embodiments of a housing assembly 10, 110 and 210 for a battery module. Each housing assembly 10, 110 and 210 is adapted to receive a battery module for installation of the battery module in a vehicle or other equipment designed to employ a specific battery size even though the battery module to be installed is sized differently from the specific battery size intended for the vehicle or other equipment.

Figure 1:
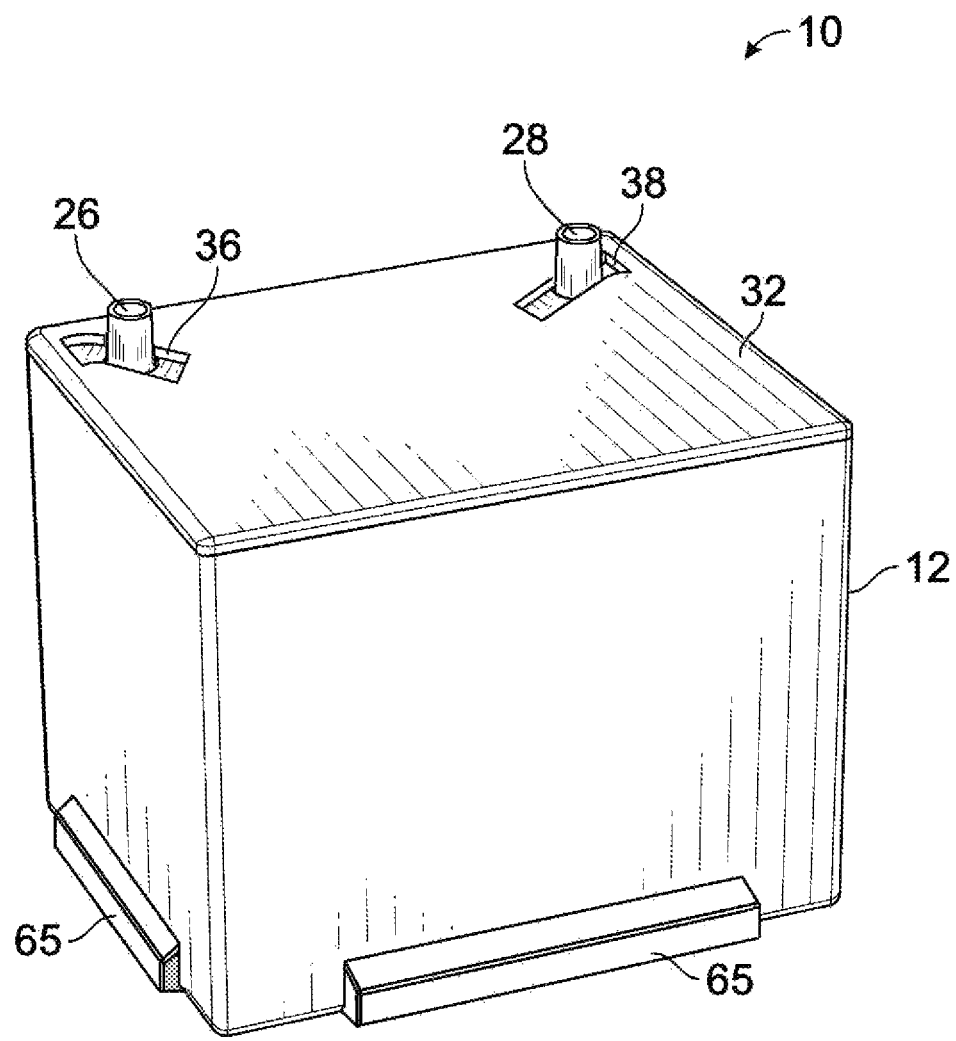
FIG. 1 is a perspective view of a housing assembly in accordance with an embodiment of the present disclosure.
Figure 2:
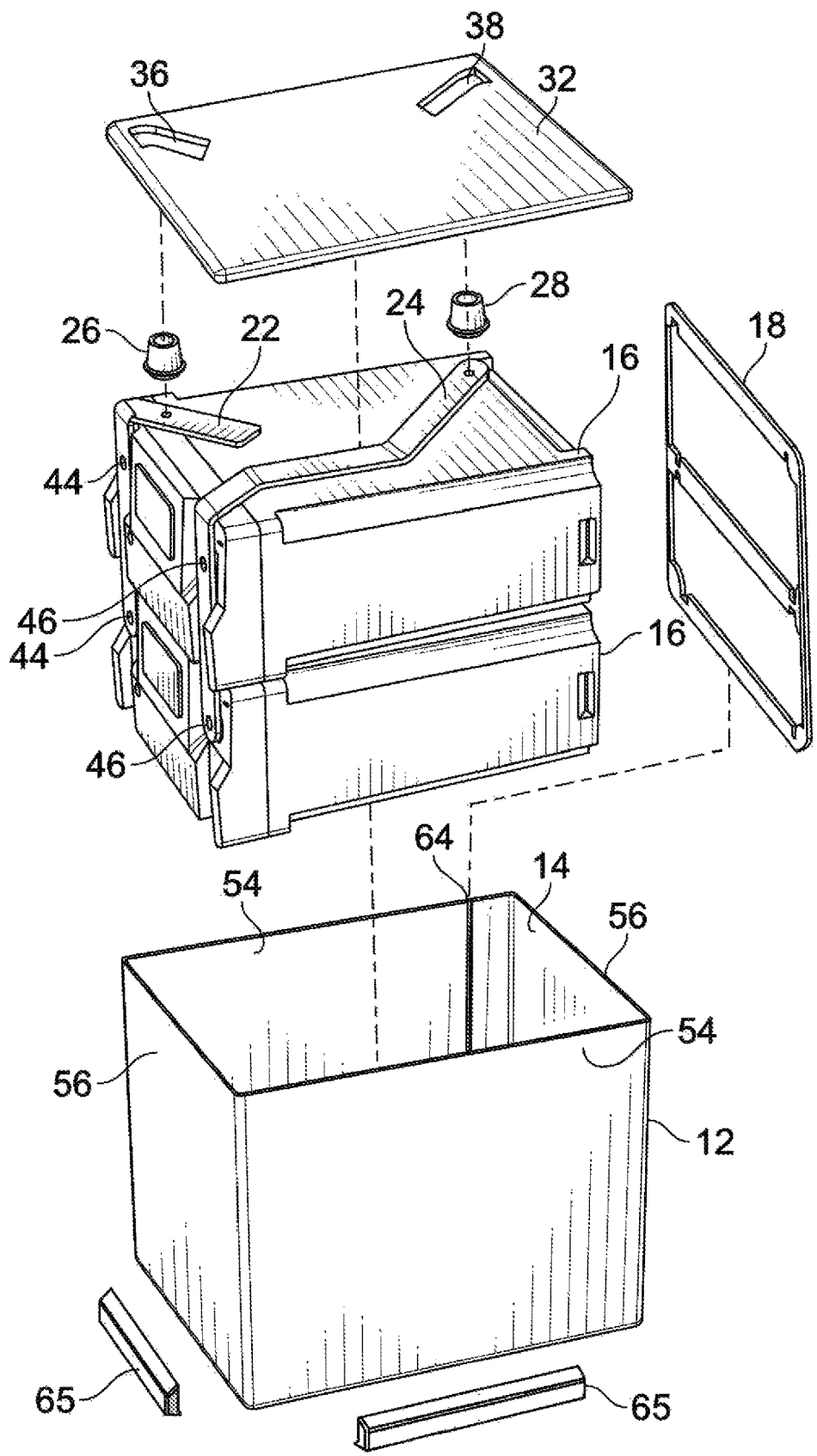
FIG. 2 is an exploded view of the housing assembly of FIG. 1 also illustrating the battery modules contained therein.
Figure 3:
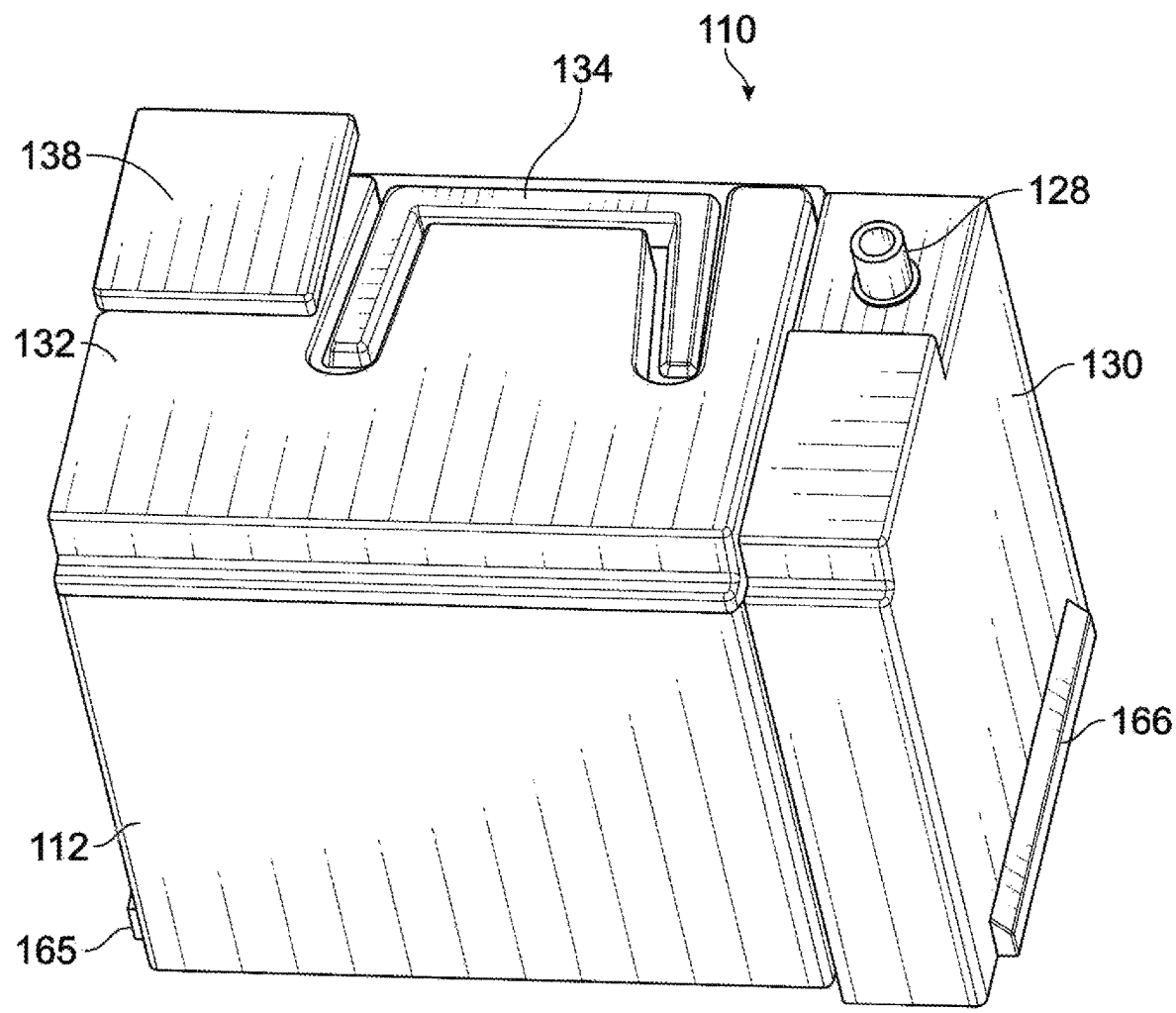
FIG. 3 is a perspective view of a housing assembly in accordance with another embodiment of the present disclosure.
Figure 4:
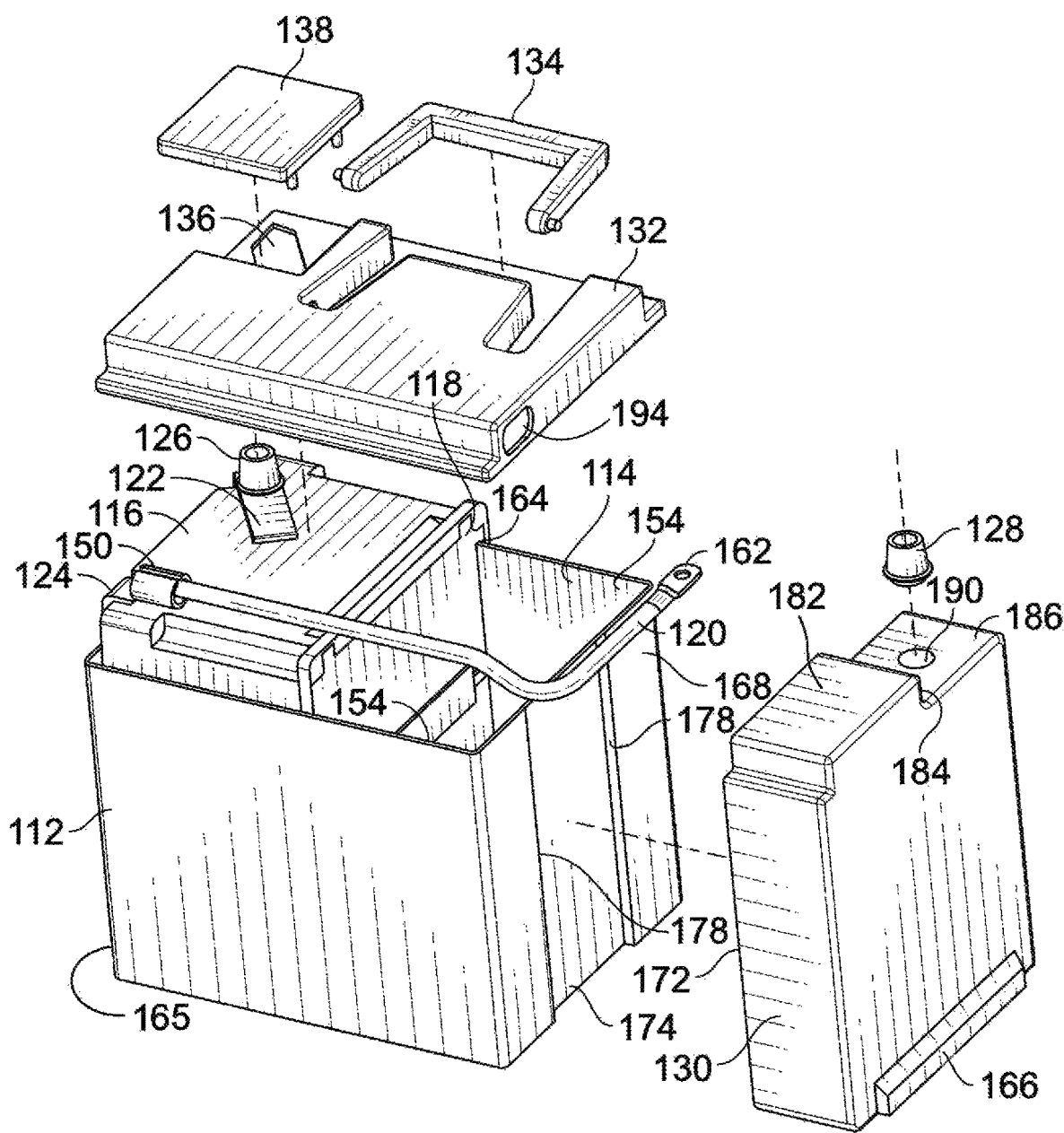
FIG. 4 is a partially exploded view of the housing assembly of FIG. 3 also illustrating the battery modules contained therein.
Figure 5:
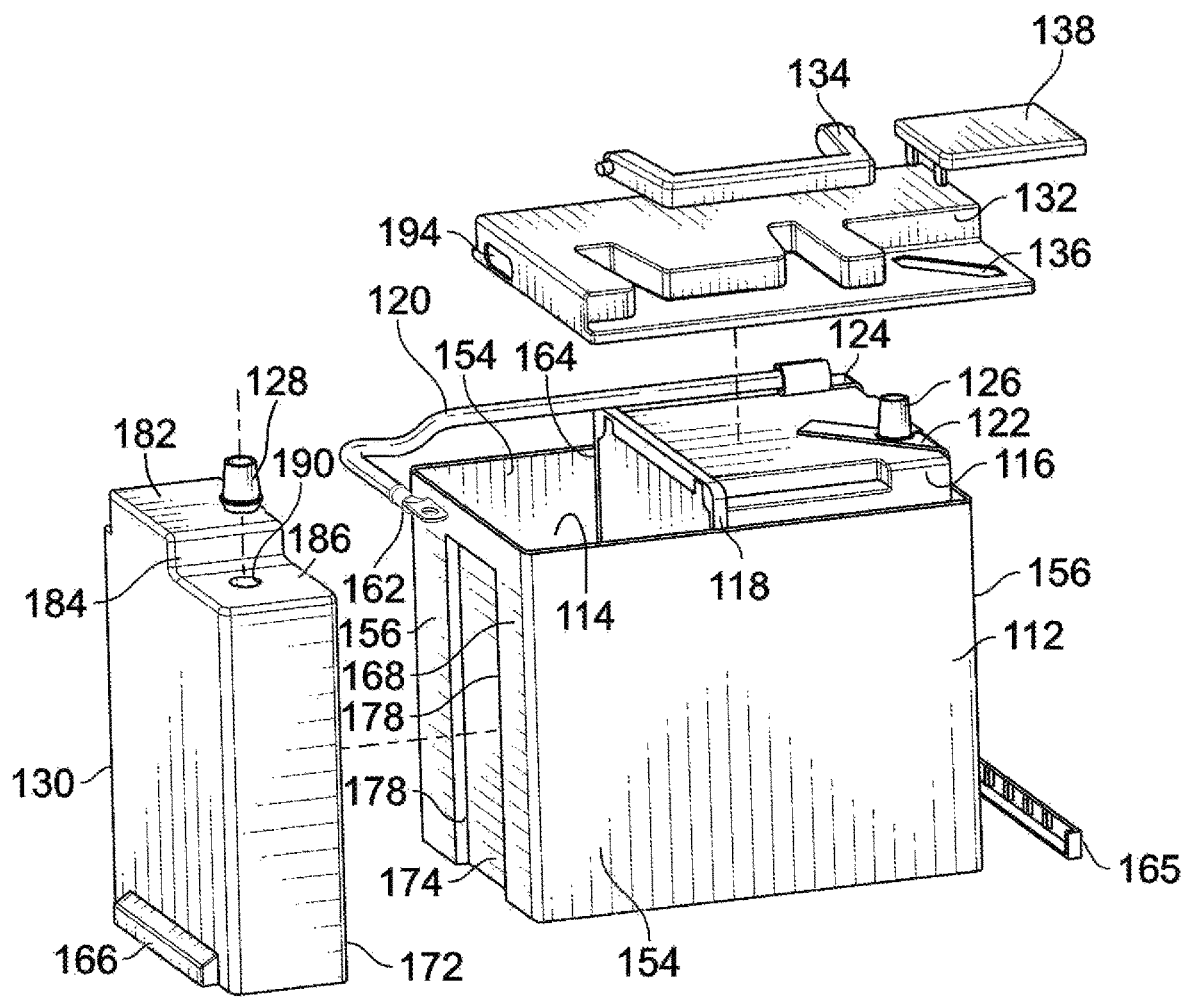
FIG. 5 is another partially exploded view of the housing assembly of FIG. 3 from another perspective also illustrating the battery modules contained therein.
Figure 6:
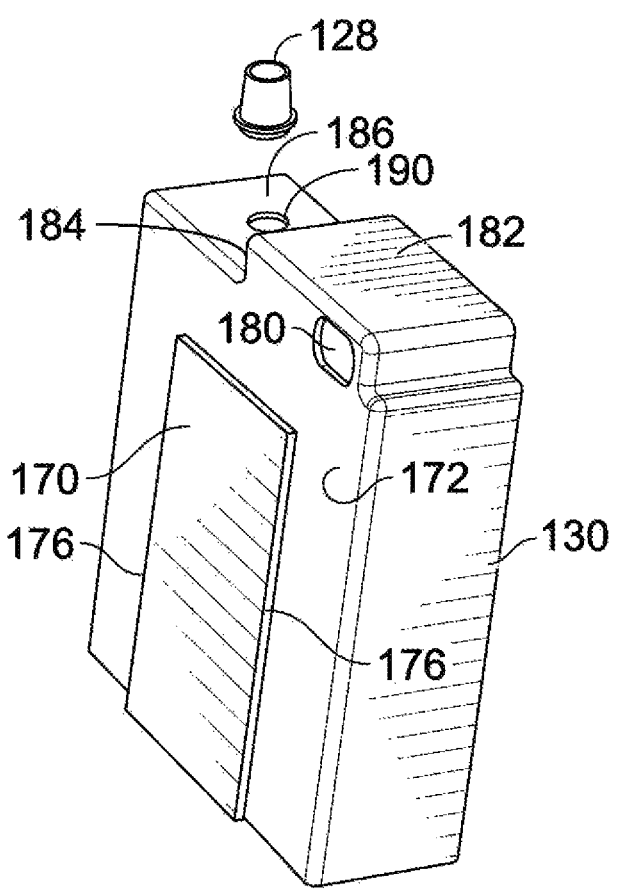
FIG. 6 is a perspective view of the extension and the negative battery terminal of the housing assembly of FIG. 3.
Figure 7:
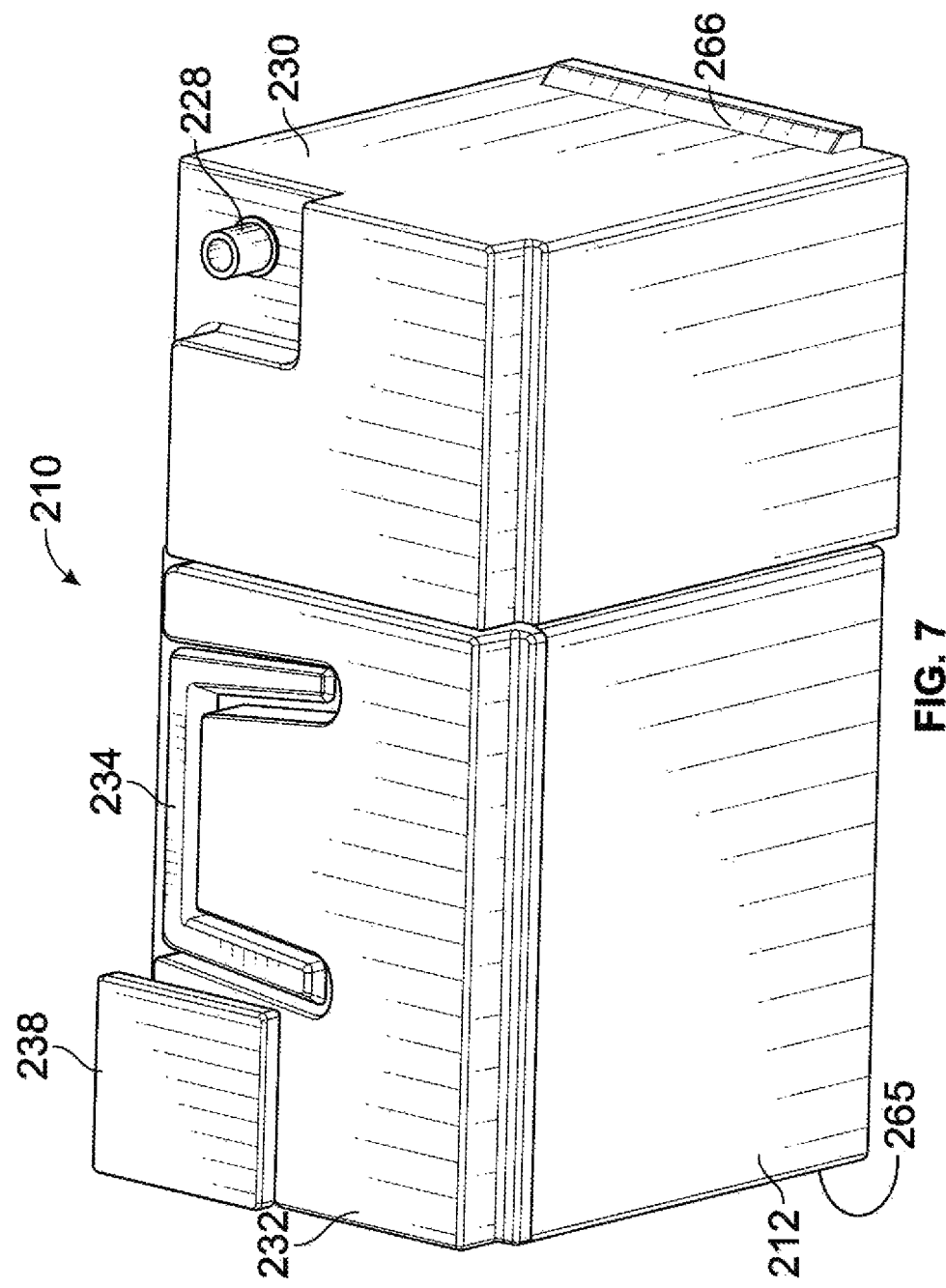
FIG. 7 is a perspective view of a housing assembly in accordance with another embodiment of the present disclosure.
Figure 8:
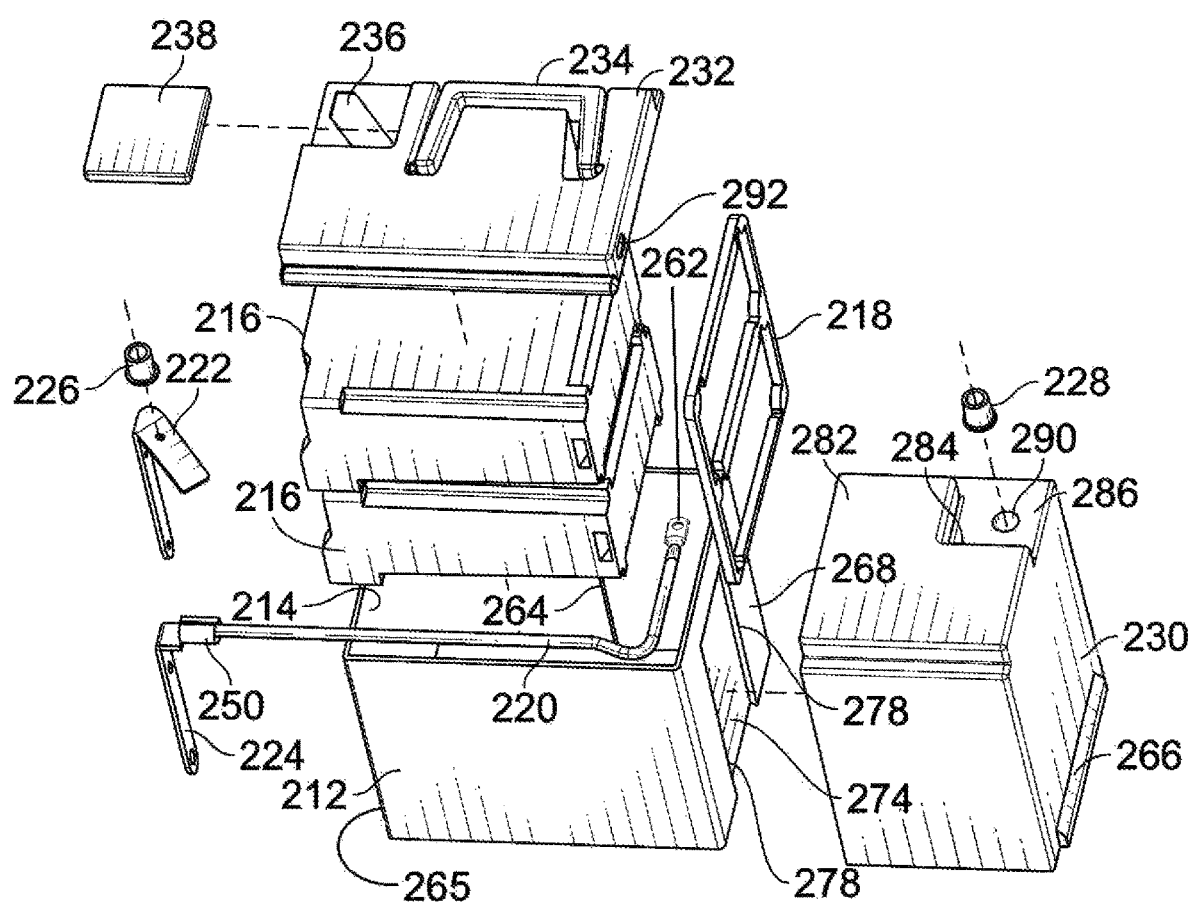
FIG. 8 is a partially exploded view of the housing assembly of FIG. 7 also illustrating the battery modules contained therein.
Figure 9:
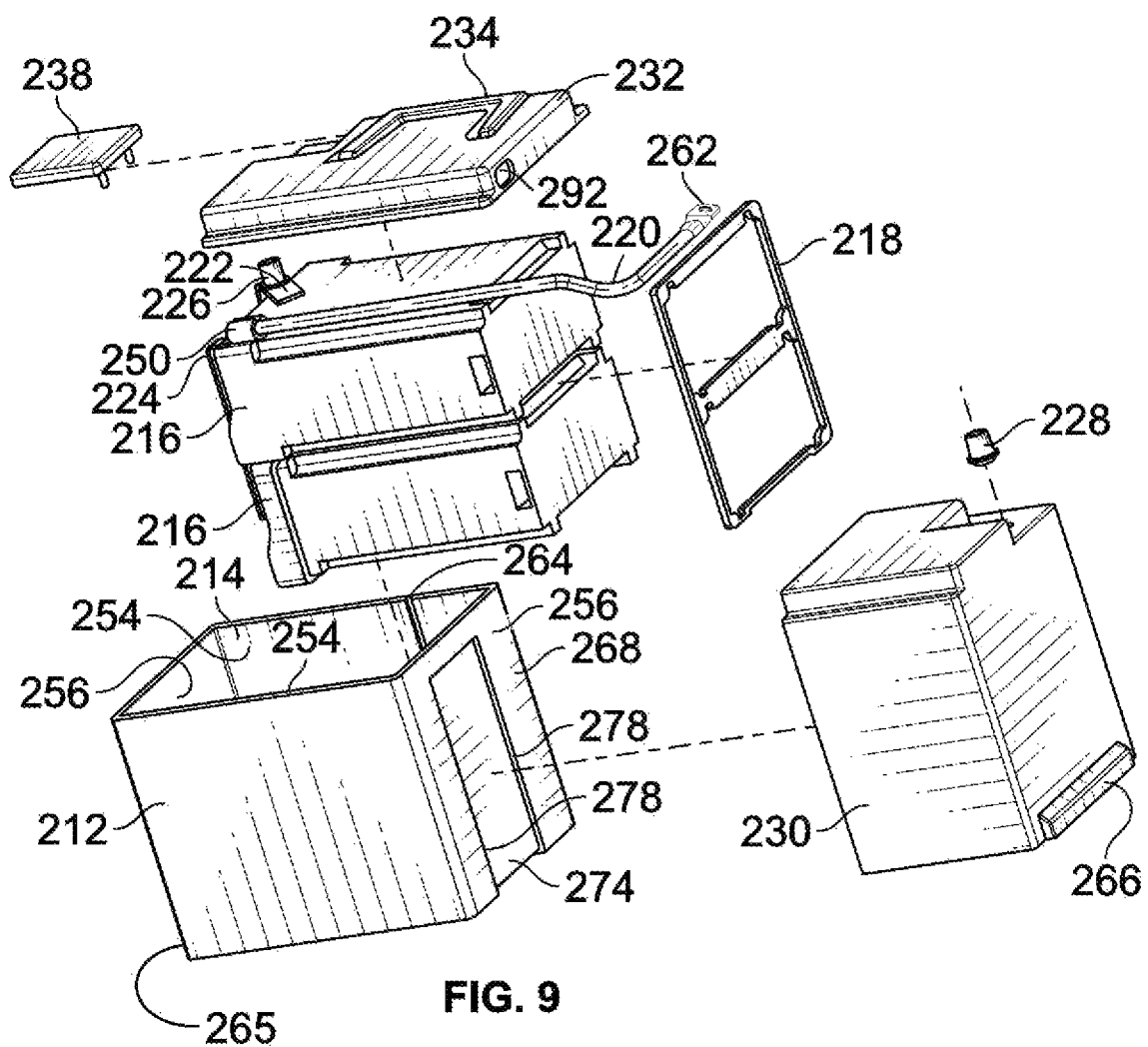
FIG. 9 is another partially exploded view of the housing assembly of FIG. 7 from another perspective also illustrating the battery modules contained therein.
Figure 10:
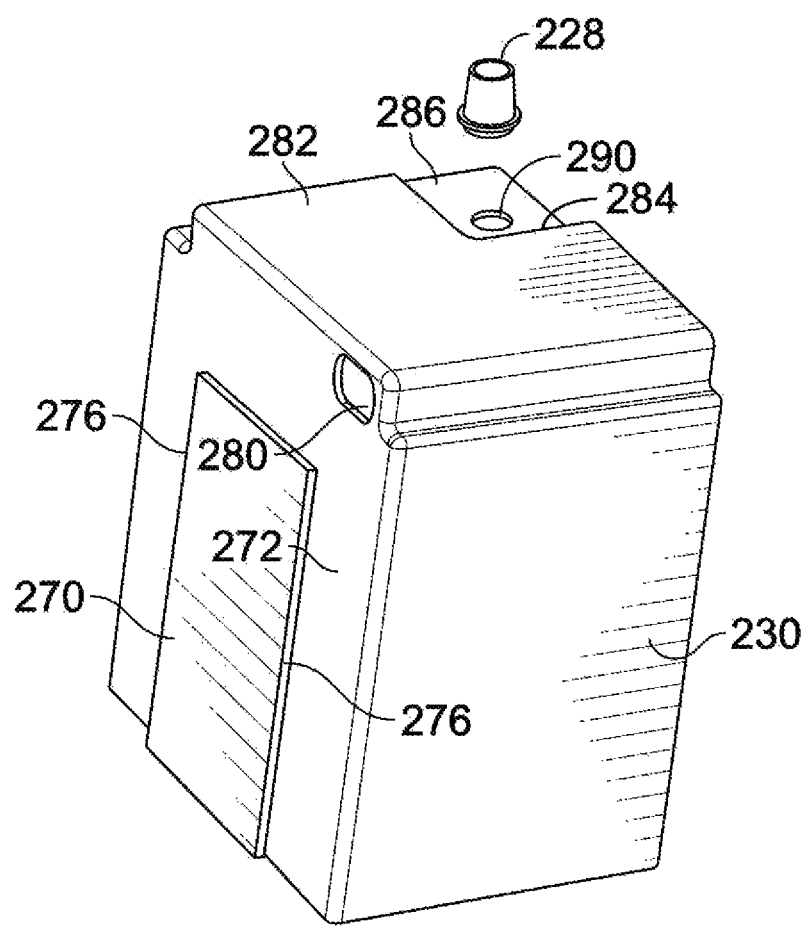
FIG. 10 is a perspective view of the extension and the negative battery terminal of the housing assembly of FIG. 7.

With reference to FIGS. 1-2, the housing assembly 10 includes a receiver 12 that defines a receptacle 14 receiving a pair of battery modules 16, one or more partitions 18, a first electrical connector in the form of a positive terminal busbar 22, a second electrical connector in the form of a negative terminal busbar 24, a positive battery terminal 26, a negative battery terminal 28 and a lid 32 that encloses the top of the receptacle 14. The lid 32 defines a pair of apertures 36 and 38 for receiving the positive battery terminal 26 and the negative battery terminal 28. The lid 32 also may include a handle.

The battery modules 16 may be of any suitable size configured to be received within the receptacle 14 and may instead be a single battery module or multiple battery modules. Each battery module 16 includes a positive battery terminal 44 and a negative battery terminal 46.

The positive terminal busbar 22 interconnects the positive battery terminals 44 of the battery modules 16 with the positive battery terminal 26 of the housing assembly. The positive terminal busbar 22 is connected and secured to the positive battery terminals 44 of the battery modules 16 by a pair of button screws or by any other suitable joining method. The positive terminal busbar 22 is connected and secured to the positive battery terminal 26 of the housing assembly 10 by a button screw or any other suitable joining method. The positive terminal busbar 22 instead may be any other suitable electrical connector such as a cable, a bar or other suitable connector or combination of any of the foregoing.

The negative terminal busbar 24 interconnects the negative battery terminals 46 of the battery modules 16 with the negative battery terminal 28. The negative terminal busbar 24 is connected and secured to the negative battery terminals 46 of the battery modules 16 by a pair of button screws or by any other suitable joining method. The negative terminal busbar 24 is connected and secured to the negative battery terminal 28 by a button screw or by any other suitable joining method. The negative terminal busbar 24 instead may be any other suitable electrical connector such as a cable, a bar or other suitable connector or a combination of any of the foregoing.

The partition 18 is received by the receptacle 14 and is positioned next to the battery modules 16 to limit or eliminate movement of the battery modules within the receptacle or for otherwise holding the battery modules in place. The illustrated partition 18 is in the form of a frame with side rails, top and bottom rails, and a rail interconnecting the side rails. The partition 18 may have any other configuration that complements the side of the battery modules 16. The receiver 12 includes two pairs of opposed walls 54 and 56. The receiver 12 includes engaging structure for engaging the partition 18. In the illustrated embodiment, for example, the engaging structure defines a pair of opposed slots 64 on the opposed walls 54 for slidingly engaging the partition 18. The location of the slots 64 depends upon the sizes of the battery modules 16 received within the receptacle 14. The engaging structure may be in any other suitable form and, in accordance with other embodiments, provide alternative locations for the partition 18 for adjustably positioning the partition 18 at the suitable location.

The receiver 12 may incorporate up to four hold-down brackets 65. One on each side. They may be removable as illustrated on FIG. 2. The receiver 12 may be secured to the vehicle in any other suitable manner in accordance with other embodiments of the present disclosure.

The receiver 12, the partition 18, the lid 32 and the detachable hold-down brackets may be constructed of plastic or any other suitable material and may have any suitable configuration. The first and second electrical connectors may be constructed of metal or any other suitable material and may have any suitable configuration.

The distance between the positive battery terminal 26 and negative battery terminal 28 of the housing assembly 10 depends upon the vehicle and the size of the battery the vehicle was designed to accommodate. For example, the distance between positive and negative battery terminals of a standard 8.2" battery is about 6". For example, if the vehicle was intended for use with such a standard 8.2" battery, the distance between the positive and negative battery terminals of the housing assembly would be about 6". The housing assembly 10 can be used with battery modules 16 having a distance between the positive and negative terminals 44 and 46 of the battery modules that is less than the distance between the positive battery terminal 26 and the negative battery terminal 28 of the housing assembly. By turning the battery modules 180° in the receptacle, the polarity of terminals 26 and 28 in the housing assembly 10 may be reversed.

With reference to FIGS. 3-6, the housing assembly 110 includes a receiver 112 that defines a receptacle 114 receiving a pair of battery modules 116, one or more partitions 118, a first electrical connector in the form of a positive terminal busbar 122, a second electrical connector in the form of negative terminal busbar 124 and terminal cable 120, a positive battery terminal 126, a negative battery terminal 128, an extension 130 and a lid 132 that encloses the top of the receptacle 114. The lid 132 defines an aperture 136 for receiving the positive battery terminal 126. The lid 132 also may include a handle 134. The lid 132 may also include a battery terminal lid 138 to enclose the positive battery terminal 126.

The battery modules 116 may be of any suitable size configured to be received within the receptacle 114 and may instead be a single battery module or multiple battery modules. Each battery module 116 includes a positive battery terminal and a negative battery terminal.

The positive terminal busbar 122 interconnects the positive battery terminals of the battery modules 116 with the positive battery terminal 126 of the housing assembly 110. The positive terminal busbar 122 is connected and secured to the positive battery terminals of the battery modules 116 by a pair of button screws or by any other suitable joining method. The positive terminal busbar 122 is connected and secured to the positive battery terminal 126 by a button screw or any other suitable joint method. The positive terminal busbar 122 instead may be any other suitable electrical connector such as a cable, a bar or other suitable connector or combination of any of the foregoing.

The terminal cable 120 interconnects the negative busbar 124 and the negative battery terminal 128. The negative terminal busbar 124 includes a crimp connection 150 for engaging the terminal cable 120. The negative terminal busbar 124 is connected and secured to the negative battery terminals of the battery modules 116 by a pair of button screws or any other suitable joining method. The terminal cable 120 is flexible and may be comprised of copper or other suitable metal or material. The terminal cable 120 is shaped to extend into the extension 130. The terminal cable 120 terminates in an eyelet crimp connector 162. The eyelet crimp connector 162 is connected and secured to the negative battery terminal 128 by a button screw, a washer, a lock washer and a nut or by any other suitable joining method. The terminal cable 120 and the negative terminal busbar 124 each instead may be any other suitable electrical connector such as a cable, a bar or other suitable connector or combination of any of the foregoing.

The partition 118 is received by the receptacle 114 and is positioned next to the battery modules 116 to limit or eliminate movement of the battery modules within the receptacle or for otherwise holding the battery modules in place. The receiver 112 includes two pairs of opposed walls 154 and 156 and engaging structure for engaging the partition 118. In the illustrated embodiment, for example, the engaging structure defines a pair of opposed slots 164 on the opposed walls 154 for slidingly engaging the partition 118. The location of the slots 164 depends upon the sizes of the battery modules 116 received within the receptacle 114. The engaging structure may be in any other suitable form and, in accordance with other embodiments, provide alternative locations for the partition 118 for adjustable positioning the partition 118 at the suitable location.

The extension 130 and the receiver 112 each have engaging structure to engage the extension and receiver in any suitable manner. In the illustrated embodiment, for example, the extension 130 includes engaging structure in the form of an embossment 170 that extends along its inner side 172 and the receiver 112 includes engaging structure in the form of an outer wall 168 that defines a slot 174 for slidingly engaging the embossment. The embossment 170 includes a pair of walls 176 that extend parallel at an outward angle from the inner side 172 of the extension 130. The slot 174 has an open bottom end and is defined by two parallel walls 178 that extend inward at an angle to facilitate the sliding engagement of the embossment 170 into the slot.

The inner side 172 of the extension 130 defines an aperture 180. The top surface 182 of the extension 130 includes a wall 184 defining a corner notch 186 and defines an aperture 190 within the notch for receiving the negative battery terminal 128. The terminal cable 120 extends through an aperture 194 defined by the lid 132, and aperture 180 to the negative battery terminal location where the eyelet crimp connector end of terminal cable 120 is secured inside extension 130 to the negative battery terminal 128 by a button screw, a washer, a lock washer and a nut or by any other suitable joining method.

The receiver 112 may incorporate up to three hold-down brackets 165. One on each exposed side. They may be removable as illustrated on FIG. 5. The extension 130 may also incorporate a hold-down bracket 166 with a window (not shown) above to secure the assembly within the vehicle. The receiver 112 may be secured to the vehicle in any other suitable manner in accordance with other embodiments of the present disclosure.

The receiver 112, the partition 118, the extension 130, the lid 132, the handle 134, the terminal lid 138 and the detachable hold-down bracket 165 may be constructed of plastic or any other suitable material and may have any suitable configuration. The first and second electrical connectors may be constructed of metal or any other suitable material and may have any suitable configuration.

The distance between the positive battery terminal 126 and negative battery terminal 128 of the housing assembly 110 depends upon the vehicle and the size of the battery the vehicle was designed to accommodate. For example, the distance between positive and negative battery terminals of a standard 11" battery is about 8.5". For example, if the vehicle was intended for use with such a standard 11" battery, the distance between the positive and negative battery terminals 126 and 128 of the housing assembly 110 would be about 8.5". The housing assembly 110 can be used with battery modules 116 having a distance between the positive and negative terminals of the battery modules that is less than the distance between the positive battery terminal 126 and the negative battery terminal 128 of the housing assembly. By turning the battery modules 180° in the receptacle, the polarity of terminals 126 and 128 in the housing assembly 110 may be reversed.

With reference to FIGS. 7-10, the housing assembly 210 includes a receiver 212 that defines a receptacle 214 receiving a pair of battery modules 216, one or more partitions 218, a first electrical connector in the form of a positive terminal busbar 222, a second electrical connector in the form of a negative terminal busbar 224 and terminal cable 220, a positive battery terminal 226, a negative battery terminal 228, an extension 230 and a lid 232 that encloses the top of the receptacle 214. The lid 232 defines an apertures 236 for receiving the positive battery terminal 226. The lid 232 also may include a handle 234. The lid 232 may also include a battery terminal lid 238 to enclose the positive battery terminal 226.

The battery modules 216 may be of any suitable size configured to be received within the receptacle 214 and may instead be a single battery module or multiple battery modules. Each battery module 216 includes a positive battery terminal and a negative battery terminal.

The positive terminal busbar 222 interconnects the positive battery terminals of the battery modules 216 with the positive battery terminal 226 of the housing assembly 210. The positive terminal busbar 222 is connected and secured to the positive battery terminals of the battery modules 116 by a pair of button screws or by any other suitable joining method. The positive terminal busbar 222 is connected and secured to the positive battery terminal 226 by a button screw or any other suitable joining method. The positive terminal busbar 222 instead may be any other suitable electrical connector such as a cable, a bar or other suitable connector or combination of any of the foregoing.

In the illustrated embodiment, for example, the terminal cable 220 interconnects the negative busbar 224 and the negative battery terminal 228. The negative terminal busbar 224 employs a crimp connection 250 for engaging the terminal cable 220. The negative terminal busbar 224 is connected and secured to the negative battery terminals of the battery modules 216 by a pair of button screws or any other suitable joining method. The terminal cable 220 is flexible and may be comprised of copper or other suitable metal or material. The terminal cable 220 is shaped to extend into the extension 230. The terminal cable 220 terminates in an eyelet crimp connector 262. The eyelet crimp connector is connected and secured to the negative battery terminal 228 by a button screw, a washer, a lock washer and a nut or by any other suitable joining method. The terminal cable 220 and the negative terminal busbar 224 each instead may be any other suitable electrical connector such as a cable, a bar or other suitable connector or combination of any of the foregoing.

The partition 218 is received by the receptacle 214 and is positioned next to the battery modules 216 to limit or eliminate movement of the battery modules within the receptacle or for otherwise holding the battery modules in place. The receiver 212 includes two pairs of opposed walls 254 and 256 and engaging structure for engaging the partition 218. In the illustrated embodiment, for example, the engaging structure defines a pair of opposed slots 264 on the opposed walls 254 for slidingly engaging the partition 218. The location of the slots 264 depends upon the sizes of the battery modules 216 received within the receptacle 214. The engaging structure may be in any other suitable form and, in accordance with other embodiments, provide alternative locations for the partition 218 for adjustable positioning the partition 218 at the suitable location.

The extension 230 and the receiver 212 each have engaging structure to engage the extension and receiver in any suitable manner. In the illustrated embodiment, for example, the extension 230 includes engaging structure in the form of an embossment 270 that extends along its inner side 272 and the receiver 212 includes engaging structure in the form of an outer wall 268 that defines a slot 274 for slidingly engaging the embossment. The embossment 270 includes a pair of walls 276 that extend parallel at an outward angle from the inner side 272 of the extension 230. The slot 274 has an open bottom end and is defined by two parallel walls 278 that extend inward at an angle to facilitate the sliding engagement of the embossment 270 into the slot.

The inner side 272 of the extension 230 defines an aperture 280. The top surface 282 of the extension 230 includes a wall 284 defining a corner notch 286 and defines an aperture 290 within the notch for receiving the negative battery terminal 228. The terminal cable 220 extends through an aperture 292 defined by the lid 232, and aperture 280 to the negative battery terminal location where the eyelet crimp connector end of terminal cable 220 is secured inside extension 230 to the negative battery terminal 228 by a button screw, a washer, a lock washer and a nut or by any other suitable joining method.

The receiver 212 may incorporate up to three hold-down brackets 265. One on each exposed side. They may be removable. The extension 230 may also incorporate a hold-down bracket 266 with a window (not shown) above to secure the assembly within the vehicle. The receiver 212 may be secured to the vehicle in any other suitable manner in accordance with other embodiments of the present disclosure.

The receiver 212, the partition 218, the extension 230, the lid 232, the handle 234, the terminal lid 238 and the detachable hold-down bracket 265 may be constructed of plastic or any other suitable material and may have any suitable configuration. The first and second electrical connectors may be constructed of metal or any other suitable material and may have any suitable configuration.

The distance between the positive battery terminal 226 and negative battery terminal 228 of the housing assembly 210 depends upon the vehicle and the size of the battery the vehicle was designed to accommodate. For example, the distance between positive and negative battery terminals of a standard 14" battery is about 11.5". For example, if the vehicle was intended for use with such a standard 14" battery, the distance between the positive and negative battery terminals of the housing assembly would be about 11.5". The housing assembly 210 can be used with battery modules 216 having a distance between the positive and negative terminals of the battery modules that is less than the distance between the positive battery terminal 226 and the negative battery terminal 228 of the housing assembly. By turning the battery modules 180° in the receptacle, the polarity of terminals 226 and 228 in the housing assembly 210 may be reversed.

The present disclosure provides many benefits. For example, vehicles are typically designed to accommodate specific size batteries (e.g., 8.2", 11" or 14") and therefore the size of batteries to be installed on such vehicles is typically limited to the specific size. The housing assembly 10, 110 or 210 of the present disclosure, however, enables smaller batteries (battery modules) to be used on such vehicles. The present disclosure, among other things, provides an efficient manner for using odd size batteries (battery modules) on vehicles designed to use a specific standard battery size.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There is a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A housing assembly for installing in a vehicle at least one battery module having a first positive battery terminal and a first negative battery terminal and a distance therebetween, the housing assembly comprising:
   a receiver defining a receptacle for receiving the battery module;
   an extension engaged with the receiver;
   a second positive battery terminal and a second negative battery terminal having a distance therebetween, the distance between the second positive battery terminal and the second negative battery terminal is greater than the distance between the first positive battery terminal and the first negative battery terminal, one of the second positive battery terminal or the second negative battery terminal disposed on the extension;
   a first electrical connector for interconnecting the first positive battery terminal and the second positive battery terminal; and
   a second electrical connector for interconnecting the first negative battery terminal and the second negative battery terminal.

2. The housing assembly of claim 1 wherein the first electrical connector comprises a first busbar and the second electrical connector comprises a second busbar.

3. The housing assembly of claim 1 wherein the first electrical connector comprises a first terminal cable and the second electrical connector comprises a second terminal cable.

4. The housing assembly of claim 1 wherein at least one of the first electrical connector and second electrical connector comprises a busbar and terminal cable.

5. The housing assembly of claim 4 further including a crimp connection for engaging the terminal cable and the busbar.

6. The housing assembly of claim 1 further comprising a partition receivable in the receptacle for holding the battery module in place within the receptacle.

7. The housing assembly of claim 6 further including engaging structure for engaging the receiver and the partition.

8. The housing assembly of claim 7 wherein the receiver defines a pair of opposed walls, the engaging structure formed on the walls.

9. The housing assembly of claim 7 wherein the engaging structure defines a slot for receivingly engaging the partition.

10. The housing assembly of claim 7 wherein the receiver includes a pair of opposed walls and the engaging structure defines on each of the walls a slot for slidably engaging the partition.

11. The housing assembly of claim 1 wherein the extension and receiver are engaged in any suitable manner.

12. The housing assembly of claim 1 wherein the extension is slidably engaged with the receiver.

13. The housing assembly of claim 12 wherein the receiver includes a wall having an outside that defines a slot and the extension includes an embossment slidingly receivable within the slot.

14. The housing assembly of claim 12 wherein the extension includes a wall having an outside that defines a slot and the receiver includes an embossment slidingly receivable within the slot.

15. The housing assembly of claim 1 wherein the receiver comprises a lid for enclosing the receptacle, the lid defining an aperture for receiving the other of the second positive battery terminal or the second negative battery terminal.

16. The housing assembly of claim 15 wherein the lid defines an aperture for receiving the first or second electrical connector.

17. The housing assembly of claim 1 wherein the extension defines an aperture for receiving said one of the second positive battery terminal or the second negative battery terminal.

18. The housing assembly of claim 17 wherein the extension defines an aperture for receiving one of the first electrical connector or the second electrical connector.

19. The housing assembly of claim 1 wherein the distance between the second positive battery terminal and the second negative battery terminal is substantially the same as the distance between a positive battery terminal and a negative battery terminal of a standard battery.

20. The housing assembly of claim 1 wherein the distance between the second positive battery terminal and the second negative battery terminal is approximately 6".

21. The housing assembly of claim 1 wherein the distance between the second positive battery terminal and the second negative battery terminal is approximately 8.5".

22. The housing assembly of claim 1 wherein the distance between the second positive battery terminal and the second negative battery terminal is approximately 11.5".

23. The housing assembly of claim 1 wherein the other of the second positive battery terminal or the second negative battery terminal is disposed on the receiver.

* * * * *